(12) United States Patent
Takada et al.

(10) Patent No.: US 8,293,427 B2
(45) Date of Patent: Oct. 23, 2012

(54) SEPARATOR UNIT AND FUEL CELL STACK

(75) Inventors: Noriyuki Takada, Tokyo (JP);
Toshihiko Nonobe, Tokyo (JP)

(73) Assignee: Kabushiki Kaisha Equos Research (JP)

( * ) Notice: Subject to any disclaimer, the term of this patent is extended or adjusted under 35 U.S.C. 154(b) by 1124 days.

(21) Appl. No.: 11/727,710

(22) Filed: Mar. 28, 2007

(65) Prior Publication Data

US 2007/0254200 A1 Nov. 1, 2007

(30) Foreign Application Priority Data

Apr. 28, 2006 (JP) ................. 2006-126366

(51) Int. Cl.
*H01M 2/08* (2006.01)
*H01M 2/14* (2006.01)
*H01M 2/38* (2006.01)
*H01M 2/40* (2006.01)
*H01M 4/64* (2006.01)
*H01M 4/66* (2006.01)
*H01M 8/04* (2006.01)
*H01M 8/24* (2006.01)

(52) U.S. Cl. ........ 429/522; 429/457; 429/508; 429/514; 429/517; 429/519

(58) Field of Classification Search .............. 429/38, 429/457, 508, 514, 517, 519, 522
See application file for complete search history.

(56) References Cited

U.S. PATENT DOCUMENTS

| | | | | |
|---|---|---|---|---|
| 4,217,401 A | * | 8/1980 | Pellegri et al. | 429/469 |
| 2005/0244702 A1 | | 11/2005 | Horiguchi | 429/34 |
| 2007/0231659 A1 | * | 10/2007 | Ma et al. | 429/35 |

FOREIGN PATENT DOCUMENTS

JP    2005-285685    10/2005

* cited by examiner

*Primary Examiner* — Basia Ridley
*Assistant Examiner* — Sean P Cullen
(74) *Attorney, Agent, or Firm* — Bacon and Thomas, PLLC

(57) ABSTRACT

A separator unit is inserted between adjacent stacked fuel cells, in each of which an electrolyte layer is sandwiched between a fuel electrode and an oxygen electrode. The separator unit includes a sheet-shaped gas barrier member, which blocks a gas, and a collector, which is inserted between the gas barrier member and the fuel electrode or the oxygen electrode and which is provided with a plurality of openings that diffuse the gas. The collector is provided with an electrode contact portion, which is made up of a flat, porous panel that is in contact with the fuel electrode or the oxygen electrode and collects power, and a gas barrier member contact portion, which is made up of a linear piece that forms a gas flow route by being in contact with the gas barrier member and supports the electrode contact portion. A height dimension of the gas barrier member contact portion is smaller than an equivalent diameter of an opening in the electrode contact portion.

12 Claims, 9 Drawing Sheets

(a)

(b)

|  | TYPE 1 | TYPE 2 | TYPE 3 |
|---|---|---|---|
|  | SHORT WIDTH DIMENSION LESS THAN 1.0 OPENING RATE 20% | SHORT WIDTH DIMENSION LESS THAN 1.0 AND LESS THAN 1.5 OPENING RATE 50% | SHORT WIDTH DIMENSION NOT LESS THAN 1.5 OPENING RATE 60% |
| VETTED PERIMETER LENGTH | 2.0 mm | 4.0 mm | 6.2 mm |
| OPENING SECTIONAL AREA | 0.3 mm$^2$ | 0.7 mm$^2$ | 1.8 mm$^2$ |
| EQUIVALENT DIAMETER | 0.5 mm | 0.7 mm | 1.2 mm |

SEPARATOR UNIT AND FUEL CELL STACK

INCORPORATION BY REFERENCE

The disclosure of Japanese Patent Application No. 2006-126366 filed on Apr. 28, 2006, including the specification, drawings and abstract is incorporated herein by reference in its entirety.

BACKGROUND OF THE INVENTION

1. Field of the Invention

The present invention relates to a fuel cell separator unit and a fuel cell stack.

2. Description of the Related Art

Conventionally, fuel cells generate electricity very efficiently and do not discharge harmful substances, so they have been put to use as industrial and household electrical generation units and as power sources for man-made satellites, spacecraft, and the like. However, in recent years their development has been progressing as power sources for use in vehicles such as passenger cars, buses, trucks, passenger carts, freight carts, and the like. Fuel cells of an aqueous alkaline solution type (AFC), a phosphoric acid type (PAFC), a molten carbonate type (MCFC), a solid oxide type (SOFC), a direct methanol type (DMFC), and the like may be used, but a solid polymer type fuel cell (PEMFC), in which pure hydrogen serves as the fuel gas, is being actively used, because the volume and weight of the system per unit output is low.

In the PEMFC, a membrane electrode assembly (MEA) is used in which a solid polymer electrolyte membrane is sandwiched between two gas diffusion electrodes to form a single unit. One of the gas diffusion electrodes serves as a fuel electrode (anode). When hydrogen gas is supplied as a fuel to the surface of the fuel electrode, the hydrogen dissociates into hydrogen ions (protons) and electrons, and the hydrogen ions move through the solid polymer electrolyte membrane. The other gas diffusion electrode serves as an oxygen electrode (cathode). When air is supplied as an oxidizing agent to the surface of the oxygen electrode, the oxygen in the air bonds with the hydrogen ions and electrons to form water. Electromotive force is generated by this electrochemical reaction.

The solid polymer electrolyte membrane fuel cell has a layered structure in which a separator, which forms a flow passage for reaction gases such as the hydrogen gas and the air, is disposed on the outside of the MEA. The separator prevents the reaction gases from permeating the MEA, which is adjacent to the separator in the layering direction, and also serves as a power collector that directs the electric current generated by the MEA to the outside. A fuel cell stack is built by stacking pluralities of MEAs and separators. Also, a technology has been proposed (for example, in Japanese Patent Application Publication No. JP-A-2005-285685) that uses a metal sheet with a mesh of expanded metal or the like as a collector for the separator, in order to supply the reaction gases to the MEA, reduce power collection resistance, maintain the solid polymer electrolyte membrane in a moist state, and the like.

However, in the conventional separator, the metal sheet with the mesh that is used is a folded sheet with a rectangular cross section. This not only increases the thermal resistance in the layering direction, resulting in inadequate cooling of the electrodes, but also raises concern that the water will obstruct rib-shaped portions, interfering with the supply of the gases. Moreover, the metal sheet with the mesh is itself easily deformed, which creates problems in the distribution of surface pressure.

SUMMARY OF THE INVENTION

The present invention provides a separator unit and a fuel cell stack that solve the problems of the conventional separator. An electrode contact surface of a separator is a flat, porous panel with a plurality of openings. A linear piece whose height dimension is smaller than the diameters of the openings is attached to an opposite face of the separator. This ensures the supplying of sufficient amounts of gases to fuel cell electrodes, low power collection resistance, sufficient strength in the stacking direction, sufficient cooling of the electrodes, and easy, low-cost manufacture.

For this purpose, the separator unit according to the present invention is inserted between adjacent stacked fuel cells, in each of which an electrolyte layer is sandwiched between a fuel electrode and an oxygen electrode. The separator unit includes a sheet-shaped gas barrier member, which blocks a gas, and a collector, which is inserted between the gas barrier member and the fuel electrode or the oxygen electrode and which is provided with a plurality of openings that diffuse the gas. The collector is provided with an electrode contact portion, which is made up of a flat, porous panel that is in contact with the fuel electrode or the oxygen electrode and collects power, and a gas barrier member contact portion, which is made up of a linear piece that forms a gas flow route by being in contact with the gas barrier member and supports the electrode contact portion. A height dimension of the gas barrier member contact portion is smaller than an equivalent diameter of an opening in the electrode contact portion.

Another separator unit according to the present invention has an opening rate of 30% to 50% in the electrode contact portion.

In yet another separator unit according to the present invention, the opening in the electrode contact portion has a rhombus shape with a shorter diagonal dimension of at least 0.7 mm and less than 1.3 mm and a longer diagonal dimension of at least 0.8 mm and less than 2.8 mm.

In a fuel cell stack according to the present invention, fuel cells, in each of which an electrolyte layer is sandwiched between a fuel electrode and an oxygen electrode, are stacked such that they sandwich a separator unit. The separator unit is inserted between the adjacent fuel cells and has a sheet-shaped gas barrier member, which blocks a gas, and a collector, which is inserted between the gas barrier member and the fuel electrode or the oxygen electrode and which is provided with a plurality of openings that diffuse the gas. The collector is provided with an electrode contact portion, which is made up of a flat, porous panel that is in contact with the fuel electrode or the oxygen electrode and collects power, and a gas barrier member contact portion, which is made up of a linear piece that forms a gas flow route by being in contact with the gas barrier member and supports the electrode contact portion. A height dimension of the gas barrier member contact portion is smaller than an equivalent diameter of an opening in the electrode contact portion.

In the separator unit according to the present invention, the separator unit is inserted between adjacent stacked fuel cells, in each of which the electrolyte layer is sandwiched between the fuel electrode and the oxygen electrode. The separator unit includes the sheet-shaped gas barrier member, which blocks the gas, and the collector, which is inserted between the gas barrier member and the fuel electrode or the oxygen electrode and which is provided with the plurality of the openings that diffuse the gas. The collector is provided with the electrode contact portion, which is made up of the flat, porous panel that is in contact with the fuel electrode or the oxygen electrode and collects power, and the gas barrier member contact portion, which is made up of the linear piece that forms the gas flow route by being in contact with the gas barrier member and supports the electrode contact portion. The height dimension of the gas barrier member contact portion is smaller than the equivalent diameter of the opening in the electrode contact portion.

In this case, it is possible to supply sufficient amounts of the gases to the electrodes of the fuel cell, and it is possible to reduce the power collection resistance. Also, because the flat electrode contact portion is supported by the barrier member contact portion, which is made up of a linear piece, deformation of the electrode contact portion is small, the distribution of surface pressure relative to the stacking load is reduced, and the electrodes can be cooled sufficiently. Moreover, manufacture is easy, so the cost of the separator unit can be reduced.

Another separator unit according to the present invention has an opening rate of 30% to 50% in the electrode contact portion.

In this case, a voltage drop in the fuel cell in a high-current region can be suppressed.

In yet another separator unit according to the present invention, the opening in the electrode contact portion has a rhombus shape with a shorter diagonal dimension of at least 0.7 mm and less than 1.3 mm and a longer diagonal dimension of at least 0.8 mm and less than 2.8 mm.

In this case, it is possible for the fuel cell to achieve good V-I characteristics.

In the fuel cell stack, the fuel cells, in each of which the electrolyte layer is sandwiched between the fuel electrode and the oxygen electrode, are stacked such that they sandwich the separator unit. The separator unit is inserted between the adjacent fuel cells and has the sheet-shaped gas barrier member, which blocks a gas, and the collector, which is inserted between the gas barrier member and the fuel electrode or the oxygen electrode and which is provided with the plurality of the openings that diffuse the gas. The collector is provided with the electrode contact portion, which is made up of the flat, porous panel that is in contact with the fuel electrode or the oxygen electrode and collects power, and the gas barrier member contact portion, which is made up of the linear piece that forms the gas flow route by being in contact with the gas barrier member and supports the electrode contact portion. The height dimension of the gas barrier member contact portion is smaller than the equivalent diameter of the opening in the electrode contact portion.

In this case, it is possible to supply sufficient amounts of the gases to the electrodes of the fuel cell, and it is possible to reduce the power collection resistance. Also, because the flat electrode contact portion is supported by the barrier member contact portion, which is made up of a linear piece, deformation of the electrode contact portion is small, the distribution of surface pressure relative to the stacking load is reduced, and the electrodes can be cooled sufficiently. Moreover, manufacture is easy, so the cost of the separator unit can be reduced.

DETAILED DESCRIPTION OF THE PREFERRED EMBODIMENTS

An embodiment of the present invention will be explained in detail below with reference to the drawings.

Figure 1:
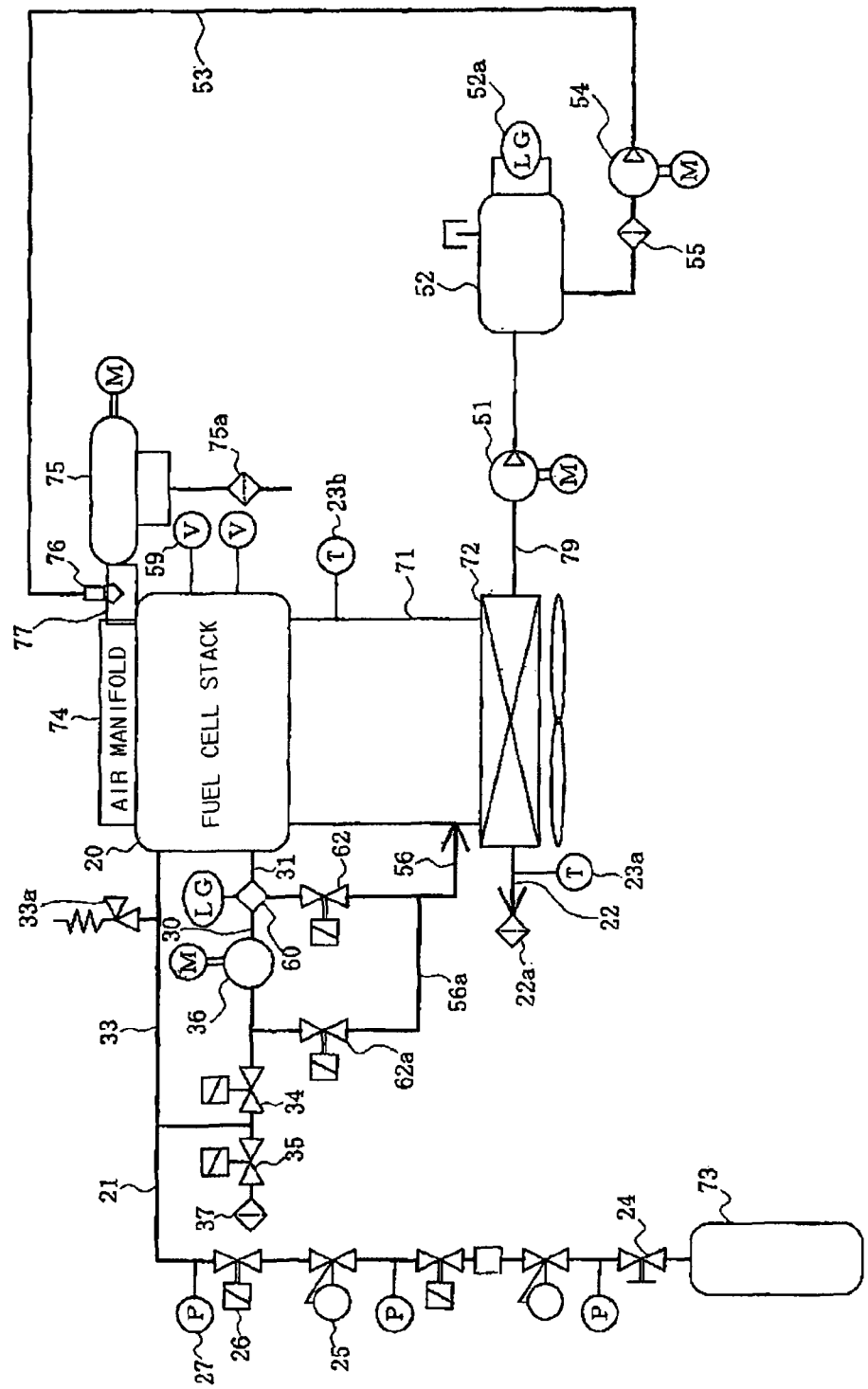
FIG. 1 is a diagram that shows a structure of a fuel cell system in an embodiment of the present invention.

FIG. 1 is a diagram that shows a structure of a fuel cell system in the embodiment of the present invention.

In FIG. 1, the reference numeral 20 denotes a fuel cell stack that serves as a fuel cell (FC) in the fuel cell system in this embodiment. The fuel cell stack 20 is used as a vehicle power source for passenger cars, buses, trucks, passenger carts, freight carts, and the like. In this embodiment, a vehicle is equipped with a plurality of accessories that consume electricity that is used even while the vehicle is stopped, such as a lighting unit, a radio, a power window, and the like. Also, the vehicle has a wide variety of driving patterns, and the output range that is required for the power source is extremely large, so the fuel cell stack 20 is used as a power source together with electricity storage devices such as a secondary battery, a capacitor, and the like.

Also, the fuel cell stack 20 may be an aqueous alkaline solution type, a phosphoric acid type, a molten carbonate type, a solid oxide type, a direct methanol type, or the like, but a solid polymer type fuel cell is preferable.

Note that it is even more preferable to use a proton exchange membrane type fuel cell (PEMFC or PEM), in which hydrogen gas serves as a fuel gas, that is, an anode gas, and oxygen or air serves as an oxidizing agent, that is, a cathode gas. Here, the PEM type fuel cell generally is made up of a stack in which a plurality of cells are connected in series. Each cell combines a catalyst and electrodes on both sides of a solid polymer electrolyte membrane, which serves as an electrolyte layer that transports ions such as protons and the like, plus a separator.

In this embodiment, the fuel cell stack 20 has a plurality of cell modules 10, which are described later. Each cell module 10 includes a plurality of sets. A set includes a unit cell (a membrane electrode assembly, or MEA) 10A and a separator 10B. The unit cell 10A serves as the fuel cell. The separator 10B electrically connects the unit cells and separates flow passages for the hydrogen gas that serves as the anode gas and the air that serves as the cathode gas, both of which gases are fed into the unit cell. Each cell module 10 is built by stacking the plurality of sets in a sheet thickness direction. Note that in each cell module 10, the unit cells 10A and the separators 10B are stacked in a plurality of layers, such that the unit cells 10A are disposed with a specified interval.

Also, each unit cell 10A, as described below, is built from a solid polymer electrolyte membrane 11, which serves as the electrolyte layer, an air electrode 12, which serves as an oxygen electrode and is disposed on one side of the solid polymer electrolyte membrane 11, and a fuel electrode 13, which is disposed on the other side of the solid polymer electrolyte membrane 11. The air electrode 12 is made up of an electrode diffusion layer, which is made of an electrically conductive material that diffuses a reaction gas as the reaction gas passes through it, and a catalyst layer, which is formed over the electrode diffusion layer and is in contact with and supported by the solid polymer electrolyte membrane 11. The unit cell 10A also has: an air electrode side collector 14 that is in contact with the electrode diffusion layer on the air electrode 12 side and that serves as a mesh-shaped collector with a plurality of openings, through which passes a mixed flow of air and water; and a fuel electrode side collector 15 that is in contact with the electrode diffusion layer on the fuel electrode side and that serves as a mesh-shaped collector to guide electric current to the outside.

Water moves in the unit cell 10A. When hydrogen gas is supplied as the fuel gas, that is, the anode gas, in a fuel chamber of the fuel electrode side collector 15, the hydrogen gas is separated into hydrogen ions and electrons, and the hydrogen ions pass through the solid polymer electrolyte membrane 11 accompanied by the proton-carrying water. Also, the air electrode 12 serves as the cathode, and when air is supplied as the oxidizing agent, that is, the cathode gas, in an oxygen chamber that serves as an air flow passage, the oxygen in the air bonds with the hydrogen ions and the electrons to form water. Note that the water content passes through the solid polymer electrolyte membrane 11 as reverse diffusion water and moves to the fuel chamber of the fuel electrode side collector 15. Here, the reverse diffusion water is the water that is formed in the oxygen chamber, which diffuses in the solid polymer electrolyte membrane 11 and passes through the solid polymer electrolyte membrane 11 in the opposite direction from the hydrogen ions, such that it infiltrates the fuel chamber.

FIG. 1 shows a device that supplies hydrogen gas as the fuel gas to the fuel cell stack 20 and a device that supplies air as the oxidizing agent to the fuel cell stack 20. Note that it is possible to supply directly to the fuel cell stack 20 hydrogen gas that has been extracted from methanol, gasoline, or the like by reforming in a reformer unit not shown in FIG. 1, but to be able to stably supply sufficient amounts of hydrogen gas even during high-load operation of the vehicle, it is preferable to supply hydrogen gas that is stored in a fuel storage unit 73. This allows a sufficient amount of hydrogen gas always to be supplied at a nearly constant pressure, so the fuel cell stack 20 can supply the required electric current, adjusting without delay to fluctuations in the vehicle load.

The fuel storage unit 73 is a container that accommodates a hydrogen storage alloy, a container that accommodates a hydrogen-producing liquid such as decalin, a hydrogen gas cylinder, or the like. The hydrogen gas is supplied from the fuel storage unit 73 to an inlet of a fuel gas flow passage of the fuel cell stack 20 through a first fuel supply line 21, which serves as a fuel supply line, and a second fuel supply line 33, which serves as a fuel supply line that is connected to the first fuel supply line 21. A hydrogen shut-off valve 24, which serves as an opening and closing valve for the fuel storage unit, a pressure sensor 27, a fuel pressure adjustment valve 25, and a hydrogen supply valve 26, which serves as a hydrogen supply solenoid valve, are disposed in the first fuel supply line 21. Also, a high-pressure hydrogen supply valve 29, which serves as a bypass valve, is disposed in a bypass line that bypasses the fuel pressure adjustment valve 25. A safety valve 33a is disposed in the second fuel supply line 33. Note that any desired number of units of the pressure sensor 27, the fuel pressure adjustment valve 25, and the hydrogen supply valve 26 may be installed. The fuel storage unit 73 has a sufficiently large capacity and has the ability always to supply hydrogen gas at a sufficiently high pressure.

Hydrogen gas that is discharged in an unreacted state from an outlet of the fuel gas flow passage of the fuel cell stack 20 is discharged to the outside of the fuel cell stack 20 through a first fuel discharge line 31. A water collection drain tank 60 is disposed as a collection container in the first fuel discharge line 31. A second fuel discharge line 30 is connected to the water collection drain tank 60 to discharge hydrogen gas that is separated from the water. A suction circulating pump 36 is disposed as a pump in the second fuel discharge line 30. A hydrogen circulating solenoid valve 34 is also disposed in the second fuel discharge line 30. Also, the second fuel supply line 33 is connected to the opposite end of the second fuel discharge line 30 from the water collection drain tank 60. This allows the hydrogen gas that is discharged to the outside of the fuel cell stack 20 to be collected, supplied to the fuel gas flow passage of the fuel cell stack 20, and reused.

A third fuel discharge line 56 is also connected to the water collection drain tank 60, and a hydrogen exhaust solenoid valve 62 is disposed in the third fuel discharge line 56 such that hydrogen gas that is discharged from the fuel gas flow passage when the fuel cell stack 20 starts operating can be discharged into the atmosphere. Note that an outlet end of the third fuel discharge line 56 is connected to an exhaust manifold 71, where the discharged hydrogen is diluted with air.

A fourth fuel discharge line 56a is connected to the second fuel discharge line 30 between the suction circulating pump 36 and the hydrogen circulating solenoid valve 34. The other end of the fourth fuel discharge line 56a is connected to the third fuel discharge line 56. A reduced pressure hydrogen discharge valve 62a, which opens when the pressure in the fuel cell stack 20 decreases, is disposed in the fourth fuel discharge line 56a. Also, an outside air intake solenoid valve 35 and an air filter 37 are connected to the second fuel discharge line 30 such that outside air can be fed in when the fuel cell stack 20 stops operating.

The fuel pressure adjustment valve 25 is a butterfly valve, a regulator valve, a diaphragm valve, a mass flow controller, a sequence valve, or the like, but it may be any type of valve, provided that it allows the pressure of the hydrogen gas that flows out of an outlet of the fuel pressure adjustment valve 25 to be adjusted to a pre-set pressure. Note that the adjustment of the pressure may be done manually, but it is preferable that the pressure be adjusted by an actuator made up of an electric motor, a pulse motor, an electromagnet, or the like.

Also, the hydrogen supply valve 26, the hydrogen circulating solenoid valve 34, the hydrogen exhaust solenoid valve 62, the reduced pressure hydrogen discharge valve 62a, and the outside air intake solenoid valve 35 are on-off type devices, each of which is operated by an actuator made up of an electric motor, a pulse motor, an electromagnet, or the like.

Note that the hydrogen shut-off valve 24 is operated manually or automatically. Also, the suction circulating pump 36 may be any type of pump, provided that it is capable of forcibly discharging the reverse diffusion water along with the hydrogen gas and creating a state of negative pressure within the fuel gas flow passage.

The air that serves as the oxidizing agent is drawn in through an air filter 75a by an air supply fan 75, which serves as an oxidizing agent supply source. The air is supplied from the air supply fan 75, through an air supply line 77 and an air intake manifold 74, to the oxygen chamber, that is, the air flow passage, of the fuel cell stack 20. In this case, the pressure of the supplied air is normal pressure that is approximately atmospheric pressure. Note that the air supply fan 75 may be any type of fan, provided that it is capable of drawing in and expelling air. Also, the air filter 75a may be any type of air filter, provided that it is capable of removing dust, impurities, and the like that are contained in the air. Note that oxygen can be used as the oxidizing agent instead of air. Air that is discharged from the air flow passage is discharged into the atmosphere through the exhaust manifold 71, which serves as a manifold, a condenser 72, an outlet side exhaust manifold 22, and an exhaust port 22a. Note that a stack exhaust temperature detector 23b, which detects the temperature of the air immediately after it is discharged from the fuel cell stack 20, is disposed in the exhaust manifold 71, and a condenser exhaust temperature detector 23a, which detects the temperature of the air immediately after it is discharged from the condenser 72, is disposed in the outlet side exhaust manifold 22. Also, a voltmeter 59, which measures the fuel cell voltage, is disposed in the fuel cell stack 20.

Also, a water supply nozzle 76 is disposed in the air supply line 77. The water supply nozzle 76 supplies water by spraying it into the air that is supplied to the air flow passage, in order to maintain the air electrode, which serves as the oxygen electrode of the fuel cell stack 20, in a moist state. Note that the air electrode 12 and the fuel electrode 13 can be cooled by the sprayed water. Also, the condenser 72, which is disposed at an end of the exhaust manifold 71, condenses and removes the water content in the air that is discharged from the fuel cell stack 20. The water that is condensed by the condenser 72 is collected in a water tank 52 through a condensed water discharge line 79. Note that a drain pump 51 is disposed in the condensed water discharge line 79, and a level gauge (water level meter) 52a is disposed in the water tank 52.

The water in the water tank 52 is supplied to the water supply nozzle 76 through a water supply line 53. Note that a water supply pump 54 and a water filter 55 are disposed in the water supply line 53. The drain pump 51 and the water supply pump 54 may be any type of pump, provided that they are pumps that can draw in and expel water. Also, the water filter 55 may be any type of filter, provided that it is capable of removing dust, impurities, and the like that are contained in the water. The condensed water discharge line 79, the drain pump 51, the water tank 52, the water supply pump 54, the water filter 55, and the water supply line 53 function as a water circulation system.

Note that in this embodiment, the fuel cell system has an FC controller that is not shown in the drawings and that serves as a control unit. The FC controller is equipped with a computation unit, such as a CPU, an MPU, or the like, a memory unit, such as a magnetic disk, a semiconductor memory, or the like, an input/output interface, and the like. The FC controller uses various types of sensors to detect the flow volume and the temperature of the hydrogen, the oxygen, the air, and the like that are supplied to the fuel gas flow passage and the air flow passage of the fuel cell stack 20, as well as the output voltage and the like. The FC controller controls the operation of various types of valves, such as the hydrogen shut-off valve 24, the fuel pressure adjustment valve 25, the hydrogen supply valve 26, the high-pressure hydrogen supply valve 29, the hydrogen circulating solenoid valve 34, the hydrogen exhaust solenoid valve 62, the reduced pressure hydrogen discharge valve 62a, the outside air intake solenoid valve 35, and the like. The FC controller controls the operation of various types of motors and the like that drive the suction circulating pump 36, the drain pump 51, the water supply pump 54, the air supply fan 75, and the like.

Next, the structure of the fuel cell stack 20 will be explained in detail.

Figure 2:
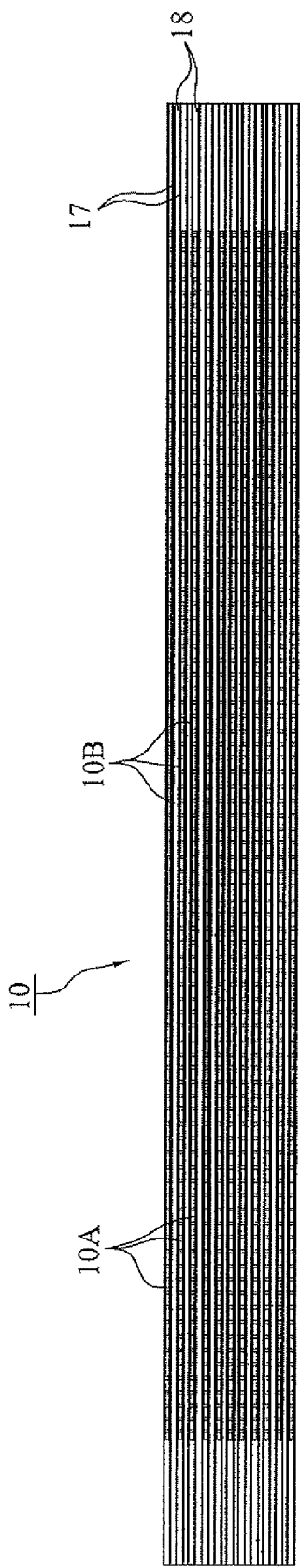
FIG. 2 is a top view of a cell module of a fuel cell stack in the embodiment of the present invention.
Figure 3:
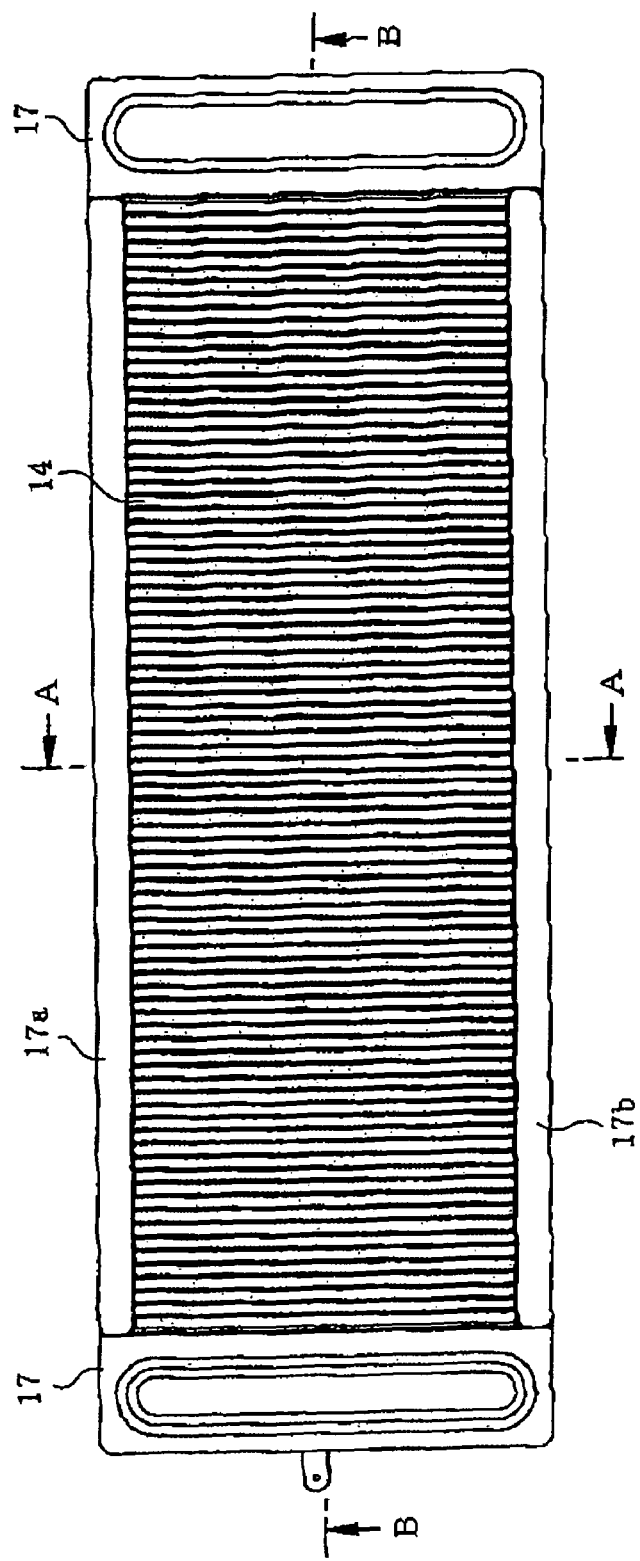
FIG. 3 is a front view, seen from an air electrode side, of the cell module of the fuel cell stack in the embodiment of the present invention.
Figure 4:
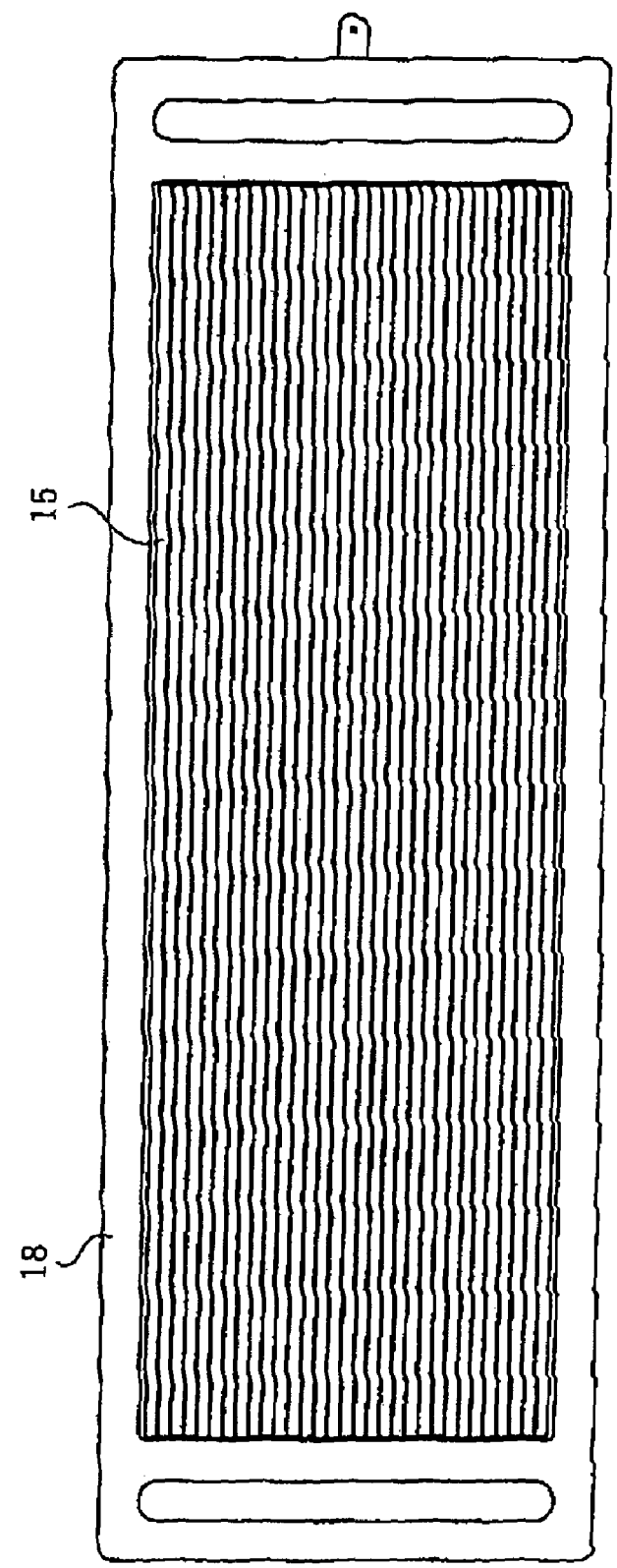
FIG. 4 is a front view, seen from a fuel electrode side, of the cell module of the fuel cell stack in the embodiment of the present invention.
Figure 5:
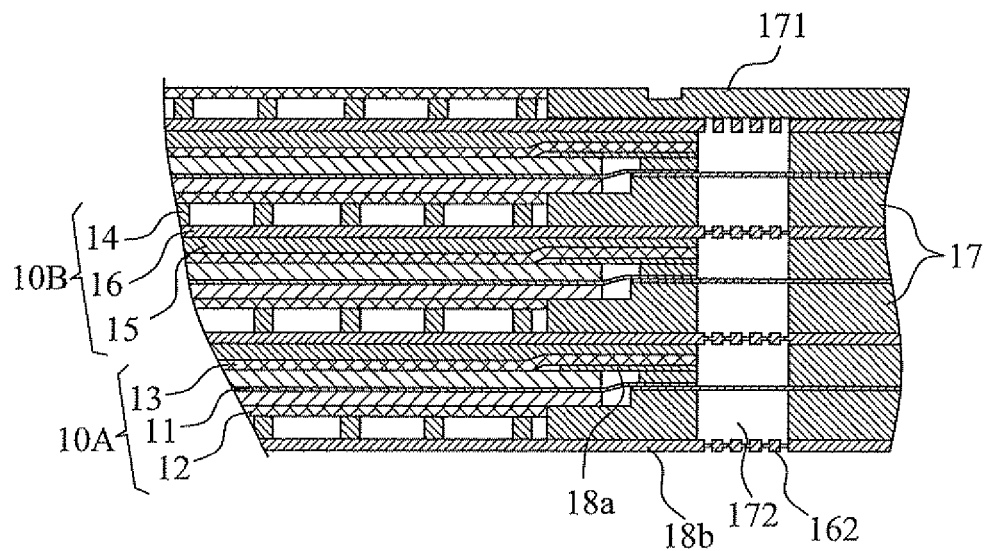
FIG. 5 is a sectional view, indicated by arrows B-B in FIG. 3, of a main part of the cell module of the fuel cell stack in the embodiment of the present invention.
Figure 6:
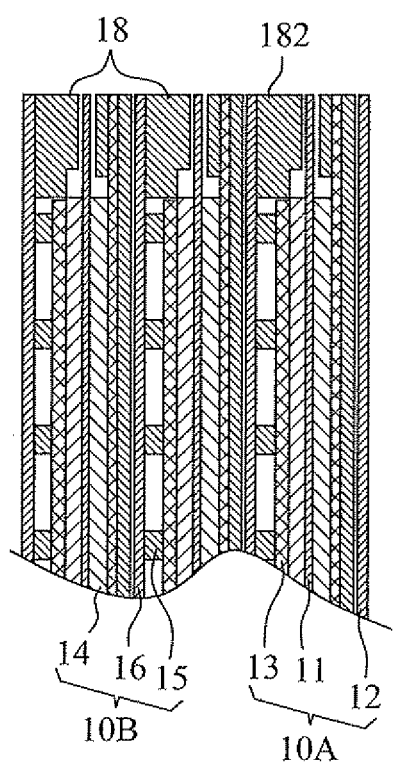
FIG. 6 is a sectional view, indicated by arrows A-A in FIG. 3, of the main part of the cell module of the fuel cell stack in the embodiment of the present invention.

FIG. 2 is a top view of the cell module of the fuel cell stack in the embodiment of the present invention. FIG. 3 is a front view, seen from the air electrode side, of the cell module of the fuel cell stack in the embodiment of the present invention. FIG. 4 is a front view, seen from the fuel electrode side, of the cell module of the fuel cell stack in the embodiment of the present invention. FIG. 5 is a sectional view, indicated by arrows B-B in FIG. 3, of a main part of the cell module of the fuel cell stack in the embodiment of the present invention. FIG. 6 is a sectional view, indicated by arrows A-A in FIG. 3, of the main part of the cell module of the fuel cell stack in the embodiment of the present invention.

As shown in the top view in FIG. 2 (top/bottom and vertical/horizontal relationships will be explained later in keeping with the disposition orientation of the cell module 10), the cell module 10 is built by stacking the plurality of the sets (ten sets in the example of FIG. 2) in the sheet thickness direction. Each set includes the unit cell 10A, the separator 10B, and two types of frames 17 and 18, which support the unit cell 10A and the separator 10B. The separator 10B electrically connects the unit cells 10A and separates the hydrogen gas flow passages and the air flow passages, which respectively feed the hydrogen gas and the air into the unit cell 10A. Note that because the unit cell 10A is positioned on an inner side of the frame 18, the unit cell 10A is not clearly shown in FIG. 2. In the cell module 10, the unit cells 10A and the separators 10B are stacked in a plurality of layers, with the two types of frames 17 and 18 alternating as spacers such that the unit cells 10A are disposed with a specified interval. On one side in the stacking direction (the top side face in FIG. 2), the cell module 10 terminates at a face of the separator 10B on which vertical convex ridges are formed and at end faces of the frame 17, as shown in FIG. 3. On the other side (the bottom side face in FIG. 2), the cell module 10 terminates at a face of the separator 10B on which horizontal convex ridges are formed and at end faces of the frame 18, as shown in FIG. 4.

As shown by the enlarged cross section structures in FIGS. 5 and 6, the unit cell 10A is made up of the solid polymer electrolyte membrane 11, the air electrode 12, and the fuel electrode 13. The air electrode 12 is provided on one side of the solid polymer electrolyte membrane 11 and serves as the oxygen electrode. The fuel electrode 13 is provided on the other side of the solid polymer electrolyte membrane 11. The air electrode 12 and the fuel electrode 13 are each made up of an electrode diffusion layer, which is made of an electrically conductive material that diffuses the reaction gas (hydrogen gas or air, respectively) as the reaction gas passes through it, and a reaction layer, which is formed over the electrode diffusion layer and contains a catalytic substance that is in contact with and supported by the solid polymer electrolyte membrane 11. Among these members, the air electrode 12 and the fuel electrode 13 have horizontal dimensions that are slightly longer than the width of an opening portion of the frame 18, which serves as a supporting member for the air electrode 12 and the fuel electrode 13, and vertical dimensions that are slightly shorter than the height of the opening portion. Also, the vertical and horizontal dimensions of the solid polymer electrolyte membrane 11 are larger all around than the vertical and horizontal dimensions of the opening portion.

The separator 10B is made up of a separator panel 16, the air electrode side collector 14, and the fuel electrode side collector 15. The separator panel 16 serves as a gas barrier member between the unit cells 10A. The air electrode side collector 14 is disposed on one side of the separator panel 16. The air electrode side collector 14 is an electrical conductor in mesh form, in which a plurality of openings are formed through which passes a mixed flow of air and water. The air electrode side collector 14 is in contact with the electrode diffusion layer of the air electrode 12 of the unit cell 10A and collects power. The air electrode side collector 14 also functions as a heat sink. The fuel electrode side collector 15 is disposed on the other side of the separator panel 16. The fuel electrode side collector 15 is an electrical conductor in mesh form that is in contact with the electrode diffusion layer of the fuel electrode 13 of the unit cell 10A and channels electric current to the outside. These members, including the unit cell 10A, must be held in a prescribed positional relationship. The frames 17 are disposed on both sides of the air electrode side collector 14. (On only the outermost frames 17, the top and bottom edges are joined by backup plates 17a and 17b to form frames (refer to FIG. 3).) The frame 18 is disposed around the perimeter edges of the fuel electrode side collector 15 and the unit cell 10A. Also, the separator panel 16 is made up of thin metal sheets with thicknesses that are thinner than the separator panel 16. The metal from which the separator panel 16 is made is an electrically conductive, corrosion-resistant metal, such as stainless steel, nickel alloy, titanium alloy, or the like that has been given a corrosion-resistant, electrically conductive treatment such as metal plating or the like. Also, the frames 17 and 18 are made of a suitable insulating material.

The frames 17 and 18 are disposed on the outer sides of the separator 10B. As shown in FIGS. 5 and 6, except on the outer edges (the uppermost portion in FIG. 5 and the left edge in FIG. 6), the frame 17, which surrounds the air electrode side collector 14, provides only vertical frame portions 171 along the short sides of the air electrode side collector 14 that enclose the air electrode side collector 14 on both sides. Long holes 172, which pass through the vertical frame portions 171 in the sheet thickness direction, are provided to form the fuel flow passages. The sheet thickness of the frame 17 is a thickness that is equal to the thickness of the air electrode side collector 14. Note that the outline dimensions of the separator panel 16 match the height and overall width of the frame 17, and the separator panel 16 is provided with long holes 162 of the same sort as the long holes 172 of the frame 17 in positions that overlie the long holes 172. Thus, the air flow passage, which is continuous in the vertical direction, is demarcated between the two vertical frame portions 171 such that it is enclosed by the air electrode 12 of the unit cell 10A and the separator panel 16.

The frame 18, which surrounds the fuel electrode side collector 15 and the unit cell 10A, is built to the same size as the frame 17, but unlike the frame 17, the frame 18 is a complete frame that is provided with left and right vertical frame portions and top and bottom horizontal frame portions 182. (The left and right vertical frame portions are not shown in FIG. 5, because they are positioned farther to the outside than the range shown in FIG. 5, but they are frame portions whose horizontal widths are roughly the same as those of the top and bottom horizontal frame portions and that have edges on both sides that are in the same positions as the left and right edges of the vertical frame portions 171 of the frame 17.) Also, except on the outer edges (the lowermost portion in FIG. 2 and the surface shown in FIG. 4), the frame 18 is provided with a thin sheet backup plate 18a and a thick sheet backup plate 18b, which extend parallel to the left and right vertical frame portions. A space that is enclosed by the backup plate 18a and the vertical frame portions 171 constitutes a space that forms the fuel flow passage, which is aligned with the long holes 172 that pass through the frame 17 in the sheet thickness direction. The sheet thickness of the frame 18 is a thickness that is nearly equal to the thickness of the wavy fuel electrode side collector 15 and the thickness of the unit cell 10A. Thus, the fuel flow passage is formed in the frame stacking direction between the two vertical frame portions 171 of the frame 17 and the backup plate 18a such that the fuel flow passage is aligned with the long holes 172 in the vertical frame portions 171 of the frame 17. Also, in the interiors of the individual frames 18, the wavy forms of the fuel electrode side collectors 15 demarcate fuel flow passages that serve as horizontal flow passages sandwiched between the separator panels 16 and the backup plates 18a.

The separator 10B is structured such that the frames 17 and 18, structured as described above, hold the air electrode side collector 14 and the fuel electrode side collector 15, as well as the separator panel 16. The cell module 10 is structured such that the separators 10B and the unit cells 10A are stacked as alternating layers. In the cell module 10 thus layered, as shown in FIG. 2, the portions that are sandwiched by the frames 18 form the slit-shaped air flow passages, which run continuously in the vertical direction from the top face of the cell module 10 to the bottom face of the cell module 10.

Next, the structure of the air electrode side collector 14 will be explained in detail.

Figure 7:
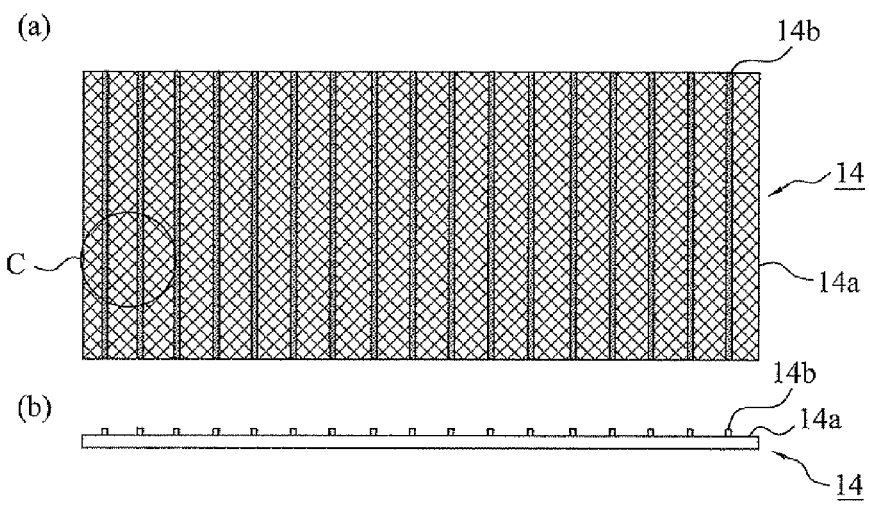
FIG. 7 is two views that show a structure of an air electrode side collector in the embodiment of the present invention.
Figure 8:
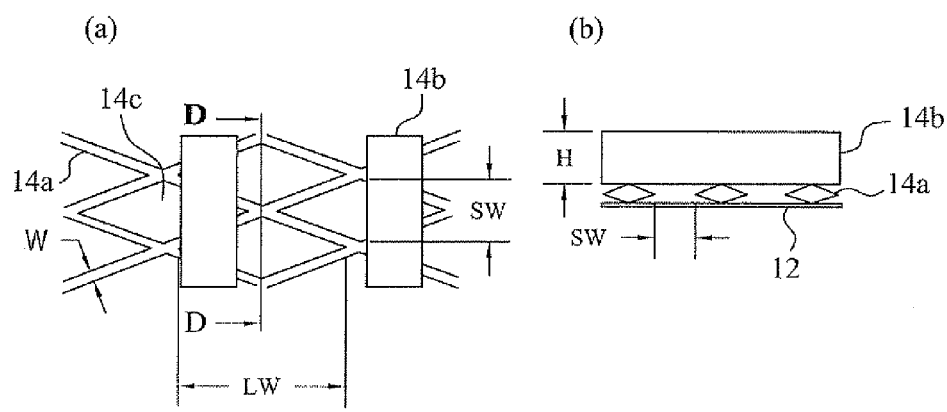
FIG. 8 is an enlarged view of the C portion shown in FIG. 7 of the structure of the air electrode side collector in the embodiment of the present invention.
Figures 9, 10:
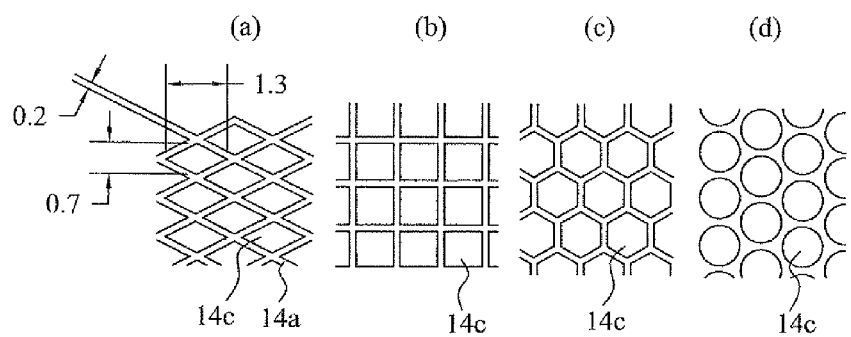
FIG. 9 is a drawing that shows examples of shapes of openings in the air electrode side collector in the embodiment of the present invention.
FIG. 10 is a table that shows dimensions of experimental examples of the air electrode side collector in the embodiment of the present invention.

FIG. 7 is two views that show the structure of the air electrode side collector in the embodiment of the present invention. FIG. 8 is an enlarged view of the C portion shown in FIG. 7 of the structure of the air electrode side collector in the embodiment of the present invention. FIG. 9 is a drawing that shows examples of shapes of openings in the air electrode side collector in the embodiment of the present invention. Note that FIG. 7A is a plan view, FIG. 7B is a side view, FIG. 8A is a plan view, and FIG. 8B is a section view of the cross section in FIG. 8A indicated by arrows D-D.

The air electrode side collector 14 in the embodiment of the present invention includes a base collector material 14a and a rib member 14b. The base collector material 14a serves as an electrode contact portion that is in contact with the air electrode 12, which serves as an electrode. The rib member 14b serves as an electrically conductive, flow route forming barrier member that forms an air supply passage by being in contact with the separator panel 16, which serves as a gas barrier member. The base collector material 14a is a flat, porous panel made of a sheet metal such as expanded metal, punched metal, or the like that has a plurality of openings 14c. One face of the base collector material 14a is an electrode contact surface that is in contact with the air electrode 12. Also, the rib member 14b is a linear piece that is joined to the base collector material 14a on the opposite face from the electrode contact surface. Note that the openings 14c may be of any shape, including, as shown in FIGS. 9A to 9D, for example, rhombus shapes, square shapes, hexagonal shapes, circular shapes, and the like. However, for purposes of this explanation, the openings 14c will be explained as having the rhombus shapes shown in FIG. 9A.

In this embodiment, the base collector material 14a is made of an electrically conductive, corrosion-resistant metal, such as stainless steel, nickel alloy, titanium alloy, or the like that has been given a corrosion-resistant, electrically conductive treatment such as metal plating or the like. On the other hand, the rib member 14b is a wire-shaped or rod-shaped member with no openings and a solid core with a rectangular cross section, and a plurality of the rib members 14b are arranged parallel to one another. Note that the rib members 14b may be made of the same material as the base collector material 14a or of a different material. Also, the cross section of the rib member 14b may be of any shape, including, for example, shapes other than rectangular, such as a circular shape, an elliptical shape, a triangular shape, or the like. The rib member 14b may also be a hollow pipe.

The rib members 14b are joined to the surface of the base collector material 14a by diffusion bonding. Diffusion bonding is a technology that makes it possible to form metal bonds between and to join bonded materials by controlling mutual diffusion between the bonded materials. This is accomplished by controlling conditions such as heating, pressurization, degree of vacuum, time, and the like, such that the metal surfaces of the bonded materials are brought so close together that the distance therebetween is at the atomic level, but without melting the base material. In this case, a high-temperature vacuum furnace is used, and the temperature in the furnace is maintained at 60% to 70% of the melting point of the bonded material. For example, if the bonded material is stainless steel, the temperature in the furnace is maintained at approximately 1000° C. The base collector material 14a and the rib members 14b, that is, the bonded materials, are held in place by a jig, with a prescribed weight applied, then placed in the furnace for a prescribed time, for example, 12 hours. The base collector material 14a and the rib members 14b can thus be joined by diffusion bonding.

Thus the air electrode side collector 14 with a plurality of convex ridges is created. In this case, the face of the base collector material 14a on the opposite side from the rib member 14b, that is, the bottom face in FIGS. 7B and 8B, functions as the electrode contact surface that is in contact with the air electrode 12. The face of the rib member 14b on the opposite side from the base collector material 14a, that is, the top face in. FIGS. 7B and 8B, functions as a barrier member contact surface that is in contact with the separator panel 16.

In the fuel cell, the separator 10B has as its functions a function to form supply flow routes for the reaction gases that are required for generating electricity, a power collection function, a function as a reinforcing member that supports the load created by the stacking of the unit cells 10A and the separators 10B, and a function to adjust the temperature for the cooling of the air electrode 12 and the fuel electrode 13. In order to fulfill these functions, in the embodiment of the present invention, the collectors of the separator 10B include the base collector material 14a and the rib member 14b. The base collector material 14a is a porous panel provided with the plurality of the openings 14c and serves as the electrode contact portion. The rib member 14b is the linear piece that is joined to the opposite face of the porous panel from the electrode contact surface and serves as a barrier member contact portion. Also, the height dimension H of the rib member 14b is smaller than a diagonal dimension SW (equivalent to the diameter) of the openings 14c in the electrode contact surface.

In order for the fuel cell to achieve highly efficient power generation and suppress power loss in the accessories, it is especially desirable to reduce the air supply pressure as much as possible. To accomplish this, it is necessary to ensure that the height (the effective sectional area) of the flow route that supplies air to the unit cell 10A is of an appropriate size. On the other hand, to make the cell module 10 more compact, it is desirable to reduce the height dimension H of the rib member 14b as much as possible. It is therefore desirable for the height dimension H of the rib member 14b to be from 0.5 to 0.9 millimeters.

In order to ensure sufficient capacity to supply air as a reaction gas, that is, to ensure sufficient gas supply capacity, the shape and dimensions of the openings 14c in the electrode contact surface of the base collector material 14a must be set such that that water that is formed in the oxygen chamber can be smoothly discharged. However, the dimensions of the openings 14c constitute the distance from the surface of the air electrode 12, which serves as an electrode, and the air electrode side collector 14, which serves as a collector, so if the dimensions of the openings 14c are too large, electrical resistance will increase. Also, if the dimensions of the openings 14c and the height dimension of the rib member 14b are too large, it becomes impossible to maintain the required crimped state between the ribs when the air electrode 12 absorbs moisture and swells. This causes detachment of the air electrode 12 from the solid polymer electrolyte membrane 11 and the formation of voids between layers, and the water that is formed in the oxygen chamber accumulates in these locations.

Accordingly, for the dimensions of the openings 14c, it is desirable for the dimension SW to be at least 0.7 mm and less than 1.3 mm and for a dimension LW to be at least 0.8 mm and less than 2.8 mm. It is also desirable for the opening rate to be 30% to 50%. Note that when the openings 14c are rhombus-shaped, as shown in FIG. 8A, SW is the dimension in the vertical direction (the shorter diagonal dimension of the openings 14c), and LW is the dimension in the horizontal direction (the longer diagonal dimension of the openings 14c). Also, in FIG. 8A, W is the dimension between adjacent openings 14c, that is, the interval width, and in FIG. 8B, H is the height dimension of the rib member 14b. Also, the relationship among H, SW, and LW is shown by Equation (1) below, in which the height dimension of the rib member 14b is no longer than the shorter diagonal dimension of the openings 14c.

$$H \leq SW < LW \qquad \text{Equation (1)}$$

For example, as shown in FIG. 9A, the dimensions can be set as follows: W=0.2 mm, SW=0.7 mm, and LW=1.3 mm. Note that H≦0.7 mm.

Note that while the explanation above concerns only the air electrode side collector 14, the same sort of structure can be used for the fuel electrode side collector 15.

Next, experimental results will be explained that form the basis for determining the ranges of the various numerical values described above.

Figure 11:
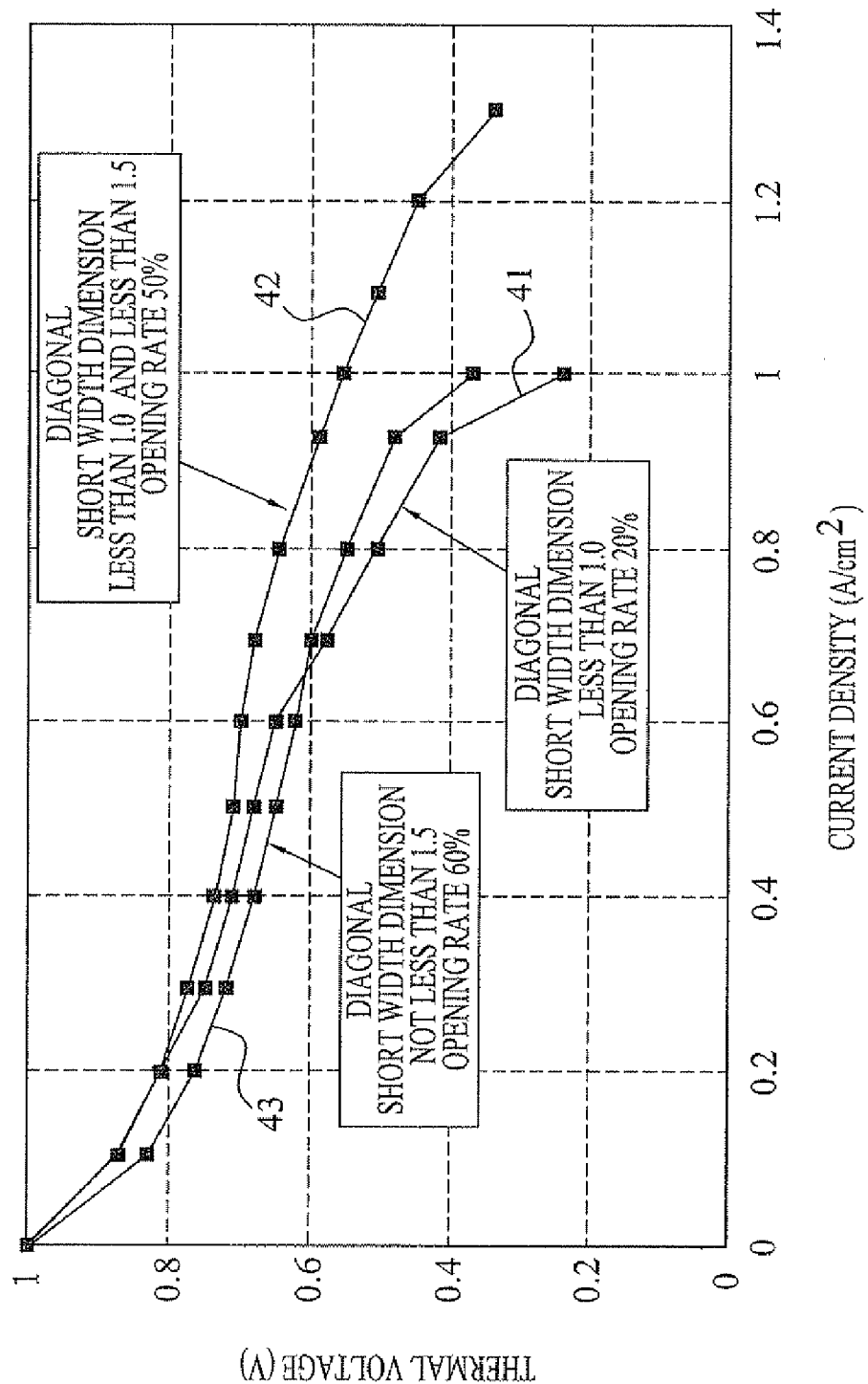
FIG. 11 is a graph that shows effects on cell performance of shapes of an electrode contact surface of the air electrode side collector in the embodiment of the present invention.
Figure 12:
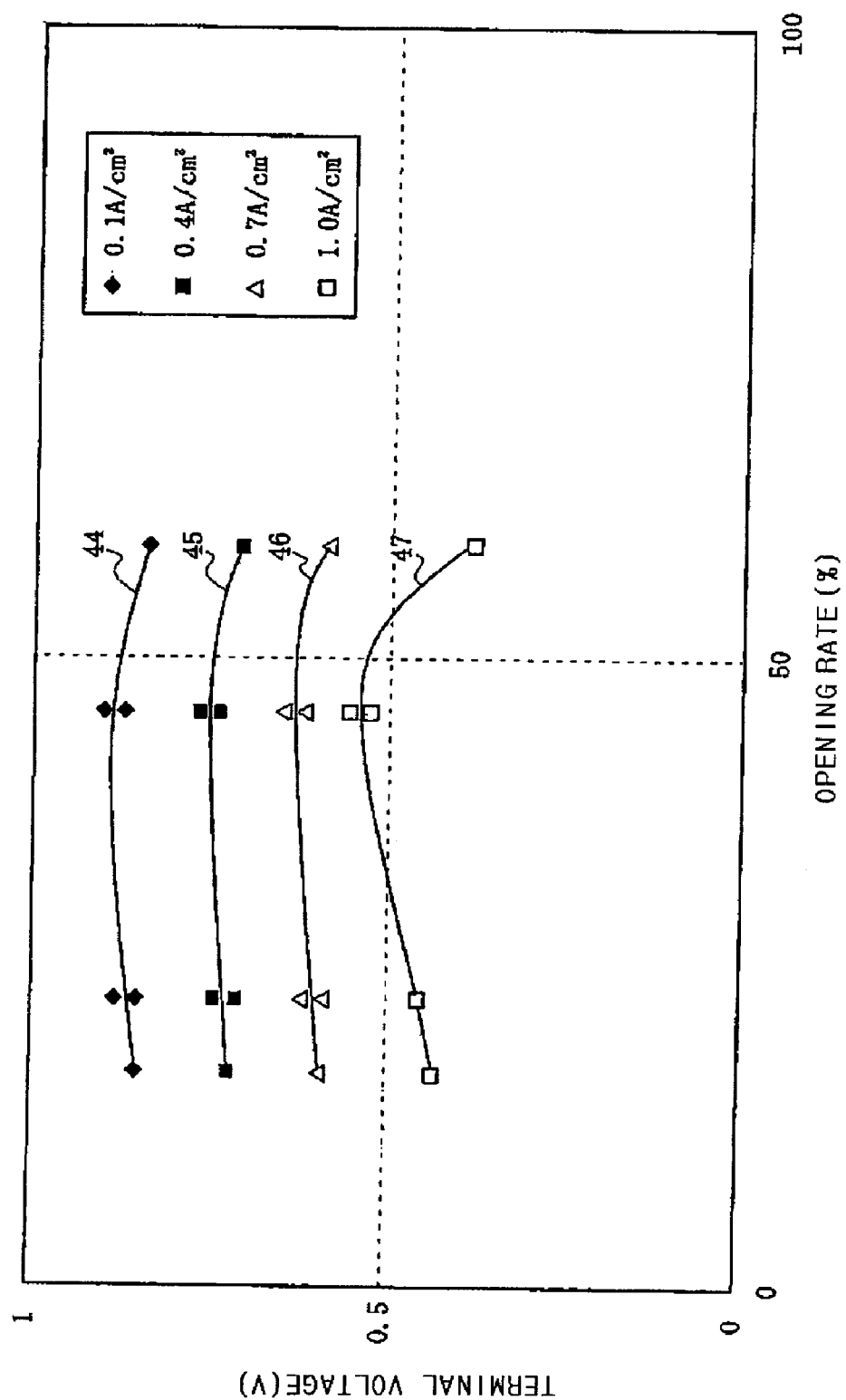
FIG. 12 is a graph that shows effects on cell performance of opening rates of the air electrode side collector in the embodiment of the present invention.

FIG. 10 is a table that shows dimensions of experimental examples of the air electrode side collector in the embodiment of the present invention. FIG. 11 is a graph that shows effects on cell performance of shapes of the electrode contact surface of the air electrode side collector in the embodiment of the present invention. FIG. 12 is a graph that shows effects on cell performance of opening rates of the air electrode side collector in the embodiment of the present invention.

The inventor of the present invention made a plurality of types of collectors using a variety of different numerical values and conducted experiments using fuel cells in which the collectors were installed. The collectors that were made for experimental use were classified into three types, with the numerical values shown in the table in FIG. 10. Note that in all of the collectors, the openings in the base panel members are rhombus-shaped.

The collectors that were classified into three types, that is, types 1 to 3, were each installed in an actual fuel cell. The results of measurements of the V-I characteristics of the fuel cells are shown in FIG. 11. Note that the vertical axis in FIG. 11 shows the terminal voltages (units: V) of the fuel cells, and the horizontal axis shows the current densities (units: A/cm²). Line 41 in FIG. 11 shows the measurement results for a fuel cell in which a collector classified as type 1 is installed. Line 42 shows the measurement results for a fuel cell in which a collector classified as type 2 is installed. Line 43 shows the measurement results for a fuel cell in which a collector classified as type 3 is installed. Note that the black squares (■) indicate points that plot the measured values obtained in the experiments. The lines 41 to 43 were obtained by connecting the black squares.

As can be seen in FIG. 11, in the fuel cell in which the collector classified as type 1 is installed and in the fuel cell in which the collector classified as type 3 is installed, the voltages drop rapidly as the fuel cells enter the high-current region. In contrast, in the fuel cell in which the collector classified as type 2 is installed, a comparatively high voltage is maintained even as the fuel cell enters the high-current region. It can be seen from this that the fuel cell in which the collector classified as type 2 is installed is preferable to the fuel cell in which the collector classified as type 1 is installed and the fuel cell in which the collector classified as type 3 is installed.

The inventor of the present invention made a plurality of types of collectors using a variety of different opening rates and conducted experiments using fuel cells in which the collectors were installed. The results of measurements of the V-I characteristics of the fuel cells in which the collectors with a variety of different opening rates were installed are shown in FIG. 12. Note that the vertical axis in FIG. 12 shows the terminal voltages (units: V) of the fuel cells, and the horizontal axis shows the opening rates (units: %). Line 44 in FIG. 12 shows the results when the current density is 0.1 A/cm². Line 45 shows the results when the current density is 0.4 A/cm². Line 46 shows the results when the current density is 0.7 A/cm². Line 47 shows the results when the current density is 1.0 A/cm². Note that the symbols ♦, ■, Δ, and □ indicate points that plot the measured values obtained in the experiments. The lines 44 to 47 were obtained by connecting the points that correspond to each value for the current density.

As can be seen in FIG. 12, in a fuel cell in which a collector with a low opening rate is installed and in a fuel cell in which a collector with a high opening rate is installed, the voltages drop rapidly as the fuel cells enter the high-current region. In contrast, in a fuel cell in which a collector with an opening rate of 30% to 50% is installed, a comparatively high voltage is maintained even as the fuel cell enters the high-current region. It can be seen from this that the fuel cell in which the collector with an opening rate of 30% to 50% is installed is preferable.

Based on experimental results like those above, the inventor of the present invention found that, as described above, for the dimensions of the openings 14c, it is desirable for the dimension SW to be at least 0.7 mm and less than 1.3 mm and for the dimension LW to be at least 0.8 mm and less than 2.8 mm. It is also desirable for the opening rate to be 30% to 50%. It is also desirable for the height dimension H of the rib member 14b to be no larger than the shorter diagonal dimension of the openings 14c.

Thus, in the embodiment of the present invention, the air electrode side collector 14 has a base collector material 14a, which is in contact with the air electrode 12, and a rib member 14b. The rib member 14b is in contact with the separator panel 16, which serves as a barrier between the hydrogen gas that is supplied to the fuel electrode 13 and the air that is supplied to the air electrode 12. The base collector material 14a is the flat, porous panel that is provided with the plurality of the openings 14c. One face of the base collector material 14a is the electrode contact surface that is in contact with the air electrode 12. The rib member 14b is the linear piece that is joined to the base collector material 14a on the opposite face from the electrode contact surface, and the height dimension H of the rib member 14b is smaller than the equivalent diameter of the openings 14c. Note that the fuel electrode side collector 15 can also be structured in the same manner as the air electrode side collector 14.

Thus, the fuel electrode side collector 15 and the air electrode side collector 14 can be made such that sufficient quantities of hydrogen gas and air can be supplied to the fuel electrode 13 and the air electrode 12, respectively, the power collection resistance is low, sufficient strength is provided in the stacking direction, the electrodes can be cooled sufficiently, and the manufacture is easy and low in cost.

Note that the present invention is not limited by the embodiment described above, that various modifications based on the essence of the present invention are possible without being excluded from the scope of the present invention.

What is claimed is:

1. A separator unit for separating adjacent stacked fuel cells in a fuel cell stack, the separator unit comprising:
    a flat gas barrier sheet member;
    a collector in the form of a flat sheet with a plurality of openings for gas passage therethrough, the collector having a first flat surface for contact with an electrode of one of the adjacent stacked fuel cells to collect power from the electrode; and
    a plurality of metal linear ribs arranged spaced and in parallel across a second flat surface of the collector, opposite the one flat surface, the metal linear ribs being bonded to the second flat surface of the collector and being in contact with a flat surface of the gas barrier sheet member to form a plurality of gas flow channels in a spacing between the gas barrier sheet member and the collector, with the gas flow channels separated by the metal linear ribs; and
    wherein the openings in the collector each have a rhombus shape with a major diagonal dimension LW and a minor diagonal dimension SW, wherein each metal linear rib has a thickness H equal to the spacing between the gas barrier sheet member and the collector and wherein a relationship between LW, SW and H is:

$$H<SW<LW.$$

2. The separator unit according to claim 1, wherein the openings in the collector form 30% to 50% of an area of the collector.

3. The separator unit according to claim 1, wherein the major diagonal dimension is at least 0.8 mm and less than 2.8 mm and the minor diagonal dimension is at least 0.7 mm and less than 1.3 mm, and wherein the major diagonal dimension is longer than the minor diagonal dimension.

4. The separator unit according to claim 1, wherein the metal linear ribs extend linearly perpendicular to the major diagonal dimension.

5. The separator unit according to claim 1, wherein the metal linear ribs are bars with a solid cross-section.

6. The separator unit according to claim 1, wherein the metal linear ribs are diffusion bonded to the second flat surface of the collector.

7. A fuel cell stack comprising a plurality of stacked fuel cell units and a separator between adjacent fuel cell units, wherein each fuel cell unit comprises a fuel electrode, an oxygen electrode and an electrolyte layer sandwiched between the fuel electrode and the oxygen electrode, and wherein the separator comprises:
- a flat gas barrier sheet member;
- a collector in the form of a flat sheet with a plurality of openings for gas passage therethrough, the collector having a first flat surface in contact with one of the fuel and oxygen electrodes of the fuel cell unit to collect power from the electrode contacted by the collector; and
- a plurality of solid metal linear ribs arranged spaced and in parallel across a second flat surface of the collector, opposite the one flat surface, the metal linear ribs being bonded to the second flat surface of the collector and being in contact with a flat surface of the gas barrier sheet member to form a plurality of gas flow channels in a spacing between the gas barrier sheet member and the collector, with the gas flow channels separated by the metal linear ribs; and wherein the openings in the collector each have a rhombus shape with a major diagonal dimension LW and a minor diagonal dimension SW, wherein each metal linear rib has a thickness H equal to the spacing between the gas barrier sheet member and the collector and wherein a relationship between LW, SW and H is:

$$H < SW:W.$$

8. The fuel cell stack according to claim 7, wherein the openings in the collector form 30% to 50% of an area of the collector.

9. The fuel cell stack according to claim 7, wherein the major diagonal dimension is at least 0.8 mm and less than 2.8 mm and the minor diagonal dimension of at least 0.7 mm and less than 1.3 mm, and wherein the major diagonal dimension is longer than the minor diagonal dimension.

10. The fuel cell stack according to claim 7, wherein the metal linear ribs extend linearly perpendicular to the major diagonal dimension LW.

11. The fuel cell stack according to claim 7, wherein the metal linear ribs are bars with a solid cross-section.

12. The fuel cell stack according to claim 7, wherein the metal linear ribs are diffusion bonded to the second flat surface of the collector.

* * * * *

UNITED STATES PATENT AND TRADEMARK OFFICE
CERTIFICATE OF CORRECTION

PATENT NO. : 8,293,427 B2
APPLICATION NO. : 11/727710
DATED : October 23, 2012
INVENTOR(S) : Noriyuki Takada et al.

Page 1 of 1

It is certified that error appears in the above-identified patent and that said Letters Patent is hereby corrected as shown below:

In the Claims

Column 16, line 7 (last line of claim 7), "H <SW:W" should read -- H <SW < LW --.

Column 16, line 13 (claim 9, line 3) "of" should read -- is --.

Signed and Sealed this
Twenty-first Day of May, 2013

Teresa Stanek Rea
*Acting Director of the United States Patent and Trademark Office*